(12) United States Patent
Yoshie et al.

(10) Patent No.: US 8,855,451 B2
(45) Date of Patent: Oct. 7, 2014

(54) OPTICAL ISOLATOR

(75) Inventors: Tomoyuki Yoshie, Chapel Hill, NC (US); Lingling Tang, Durham, NC (US); Samuel Drezdzon, Washington, DC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 13/554,099

(22) Filed: Jul. 20, 2012

(65) Prior Publication Data

US 2013/0016943 A1 Jan. 17, 2013

Related U.S. Application Data

(63) Continuation of application No. 13/219,355, filed on Aug. 26, 2011, now abandoned, which is a continuation of application No. 12/496,630, filed on Jul. 1, 2009, now Pat. No. 8,009,942.

(60) Provisional application No. 61/133,609, filed on Jul. 1, 2008.

(51) Int. Cl.
*G02B 6/12* (2006.01)
*G02B 6/122* (2006.01)
*G02B 6/27* (2006.01)

(52) U.S. Cl.
CPC .............. *G02B 6/122* (2013.01); *G02B 6/2746* (2013.01); *G02B 2006/12035* (2013.01); *G02B 2006/12097* (2013.01)
USPC .. 385/14; 385/11; 385/6; 385/92; 359/484.01

(58) Field of Classification Search
CPC ........... G02F 1/0036; G02F 1/025; G01J 9/00
USPC ................... 385/6, 4, 14; 359/484.01–484.03
See application file for complete search history.

(56) References Cited

U.S. PATENT DOCUMENTS 3,760,305 A   9/1973   Mason et al.
3,838,368 A   9/1974   Ironfield
(Continued)

FOREIGN PATENT DOCUMENTS

JP            04326320  A  *  11/1992   ............. G02B 27/28

OTHER PUBLICATIONS

Vanwolleghem et al., "Ferromagnetic-metal-based InGaAs(P)/InP optical waveguide isolator: electrical and magneto-optical characterisation", Proceedings Symposium IEEE/LEOS Benelux Chapter, 2002, Amsterdam, pp. 282-285.

(Continued)

*Primary Examiner* — Ellen Kim
(74) *Attorney, Agent, or Firm* — Mauriel Kapouytian Woods LLP; Michael Mauriel

(57) ABSTRACT

Various optical isolator embodiments are disclosed. Embodiments comprise a waveguide section utilizing materials that induce a propagation constant shift that is propagation-direction-dependent. Embodiments are characterized by a cutoff frequency for forward propagating waves that is different than the cutoff frequency for reverse waves. A particular embodiment is constructed as a single-mode waveguide on a substrate. The cross-section of the waveguide is inhomogeneous in terms of materials. This inhomogeneity induces a propagation constant shift, which is propagation-direction-dependent. This device works as an optical isolator from the cut-off frequency of the lowest forward wave (lower frequency) to one for the lowest reverse wave (higher frequency). Various configurations consistent with the principles of the invention are disclosed.

12 Claims, 10 Drawing Sheets

(56) References Cited

U.S. PATENT DOCUMENTS

| | | | |
|---|---|---|---|
| 4,642,585 | A | 2/1987 | Saad |
| 7,326,582 | B2 | 2/2008 | Speyer et al. |
| 7,567,604 | B2 | 7/2009 | Accard et al. |
| 7,995,893 | B2 * | 8/2011 | Bi et al. .................. 385/131 |
| 2004/0080805 | A1 * | 4/2004 | Levy ...................... 359/280 |
| 2005/0024167 | A1 | 2/2005 | Rawnick et al. |
| 2006/0103380 | A1 | 5/2006 | Kochergin et al. |
| 2008/0218841 | A1 * | 9/2008 | Iwasaki et al. .......... 359/280 |
| 2008/0219628 | A1 | 9/2008 | Podolskiy et al. |
| 2009/0060411 | A1 * | 3/2009 | Levy et al. .................. 385/6 |
| 2009/0208165 | A1 | 8/2009 | Nakajima et al. |
| 2010/0307678 | A1 * | 12/2010 | Yokoi ...................... 156/278 |
| 2011/0111133 | A1 | 5/2011 | Zhou et al. |
| 2011/0308735 | A1 | 12/2011 | Takeuchi et al. |

OTHER PUBLICATIONS

Amemiya et al., "Waveguide-Based 1.5 Optical Isolator Based on Magneto-Optic Effect in Ferromagnetic MnAs", Japanese Journal of Applied Physics, vol. 46, No. 1, 2007, pp. 205-210.

Amemiya et al., "1.54-um TM-mode waveguide optical isolator based on the nonreciprocal-loss phenomenon: device design to reduce insertion loss," Applied Optics, vol. 46, No. 23, Aug. 10, 2007, pp. 5784-5791.

Shimizu et al., "Fabrication and Characterization of an InGaAs/InP Active Waveguide Optical Isolator With 14.7 dB/mm TE mode Nonreciprocal Attenuation," Journal of Lightwave Technology, vol. 24, No. 1, Jan. 2006, pp. 38-43.

Hemme et al., "Integrated optical isolator based on nonreciprocal-mode cut-off," Applied Optics, vol. 29, No. 18, Jun. 20, 1990, pp. 2741-2744.

Priye et al., "Nonreciprocal behavior of leaky gyroscopic waveguide," Electronics Letters, vol. 29, No. 1, Jan. 7, 1993, pp. 104-105.

Dionne et al., "Spectral origins of giant Faraday rotation and ellipticity in Bi-substituted magnetic garnets," Journal of Applied Physics, vol. 73, No. 10, 1993, pp. 6127-6129.

Korner et al., "Integration of magneto-optical active bismuth iron garnet on nongarnet substrates," Journal of Applied Physics, vol. 103, (07B337), Mar. 27, 2008.

* cited by examiner

OPTICAL ISOLATOR

CROSS REFERENCE TO RELATED APPLICATION

This application is a continuation of U.S. application Ser. No. 13/219,355 filed Aug. 26, 2011, which is a continuation of U.S. application Ser. No. 12/496,630 filed Jul. 1, 2009, which claims the benefit of U.S. Provisional Application No. 61/133,609 filed Jul. 1, 2008. The disclosures of these related applications are hereby incorporated by reference.

BACKGROUND OF THE INVENTION

Optical isolators are optical components that transmit light in one direction but block it in the backward-propagating direction. They are used when the reversely-propagating light needs to be avoided. For example, lasers become instable when reflected light comes back to them.

Conventional optical isolators consist of a Faraday rotator and two polarizers. The linear-polarization angle needs to be rotated by 45 degrees in a Faraday rotator, which is typically a few millimeters long. Thus, this type of optical isolator becomes relatively large. It is also a challenge to build Faraday rotators and polarizers in a guided-optics format, i.e. it is hard to integrate them on chip. In order to construct guided-wave optical isolators, an asymmetric Mach-Zehnder waveguide interferometer is commonly used. This optical isolator does not require polarizers, but requires high-precision interference for blocking backward propagating light waves; one branch of the interferometer is a nonreciprocal phase shifter, and the other is a reciprocal phase shifter. However, this optical isolator still requires two long waveguides.

SUMMARY OF THE INVENTION

An embodiment of the present invention includes a waveguide section utilizing materials that induce a propagation constant shift that is propagation-direction-dependent. An embodiment of the inventive isolator is characterized by a cutoff frequency for forward propagating waves that is different than the cutoff frequency for reverse waves; the dimensions and direction of magnetization of the waveguide can be tailored so that, in a particular embodiment, the cutoff frequency for forward propagating waves is lower than the cutoff frequency for reverse waves.

A particular embodiment is constructed as a single-mode waveguide on a substrate. The cross-section of the waveguide is inhomogeneous in terms of materials. At least one part of the cross-section is a non-reciprocal magneto-optic medium, which has nonzero off-diagonal permittivity tensor components. This inhomogeneity induces the propagation constant shift, which is propagation-direction-dependent. This device works as an optical isolator from the cutoff frequency of the lowest forward wave (lower frequency) to one for the lowest reverse wave (higher frequency). Various configurations, i.e. structures with various distributions of the magneto-optic medium, may be used consistent with the principles of the invention.

BRIEF DESCRIPTION OF THE DRAWINGS

The novel features of the invention are set forth in the appended claims. However, for purpose of explanation, several aspects of a particular embodiment of the invention are described by reference to the following figures.

DETAILED DESCRIPTION OF THE INVENTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
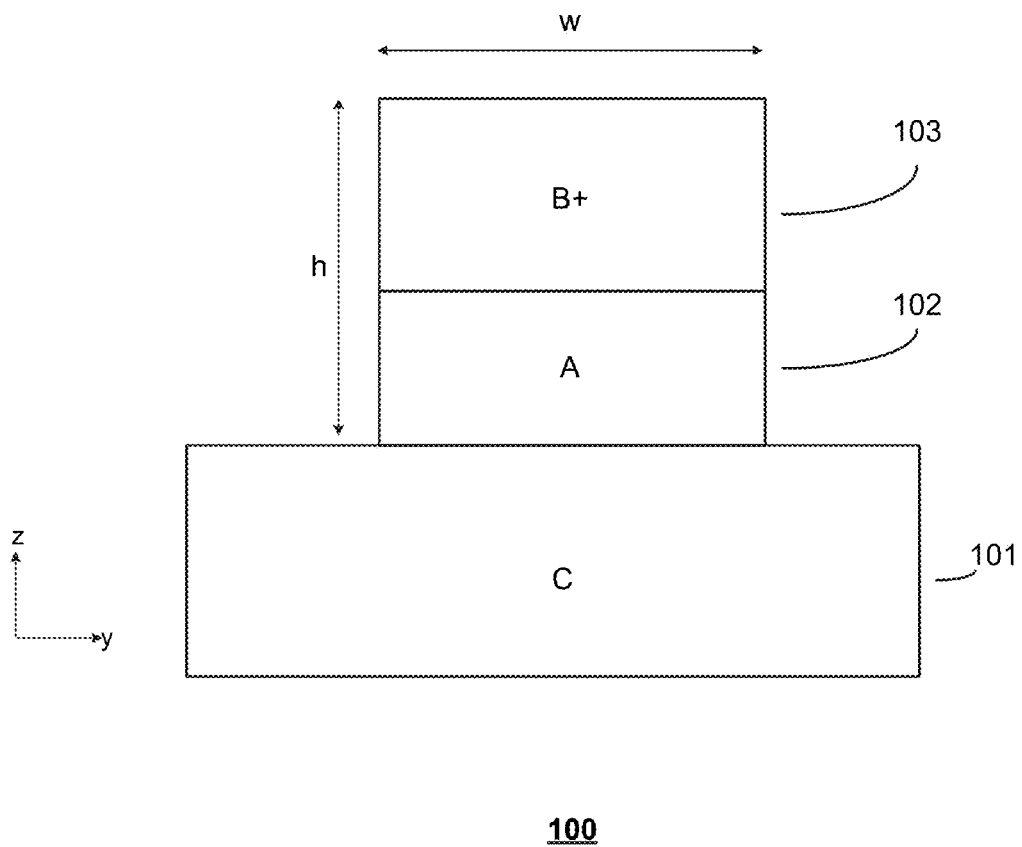
FIG. 1 illustrates an optical isolator 100 in accordance with one embodiment of the invention.

FIG. 1 illustrates an optical isolator 100 in accordance with one embodiment of the invention. Optical isolator 100 includes substrate portion 101, first waveguide portion 102, and second waveguide portion 103. Substrate portion 101 comprises a low index material C. In one embodiment, material C has a permittivity of $2.13\epsilon_0$ where $\epsilon_0$ is the permittivity in a vacuum. First waveguide portion 102 comprises a non-magnetic material A. In one embodiment, the non-magnetic material A has a permittivity of $12.25\epsilon_0$. Second waveguide portion comprises magnetic material B+. In one embodiment, the permittivity tensor $\bar{\epsilon}$ for material B+ in the embodiment of FIG. 1 (referenced as an "up down" or "ud" arrangement) is given by:

$$\bar{\epsilon}_{ud,B+} = \varepsilon_0 \begin{pmatrix} 12.25 & 0 & -if \\ 0 & 12.25 & 0 \\ if & 0 & 12.25 \end{pmatrix}$$

where the off-diagonal coefficient f=1 and the general permittivity tensor is:

$$\bar{\varepsilon} = \begin{pmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{pmatrix}$$

The z and y axis are shown in FIG. 1 and the x axis is orthogonal to the z y plane.

The waveguide of optical isolator 100 (comprising portions 102 and 103) has a height dimension h and a width dimension w. In one embodiment the ratio of h/w is 3/4. In another embodiment, the ratio is 1. The preferred ration may depend on whether the mode is a TE or a TM mode. In some embodiments, the ratio is 1/2 for TE modes and 2/1 for TM modes. However, other ratios may be used with preference given to those that help obtain a single guided mode in the desired frequency range.

Figure 2:
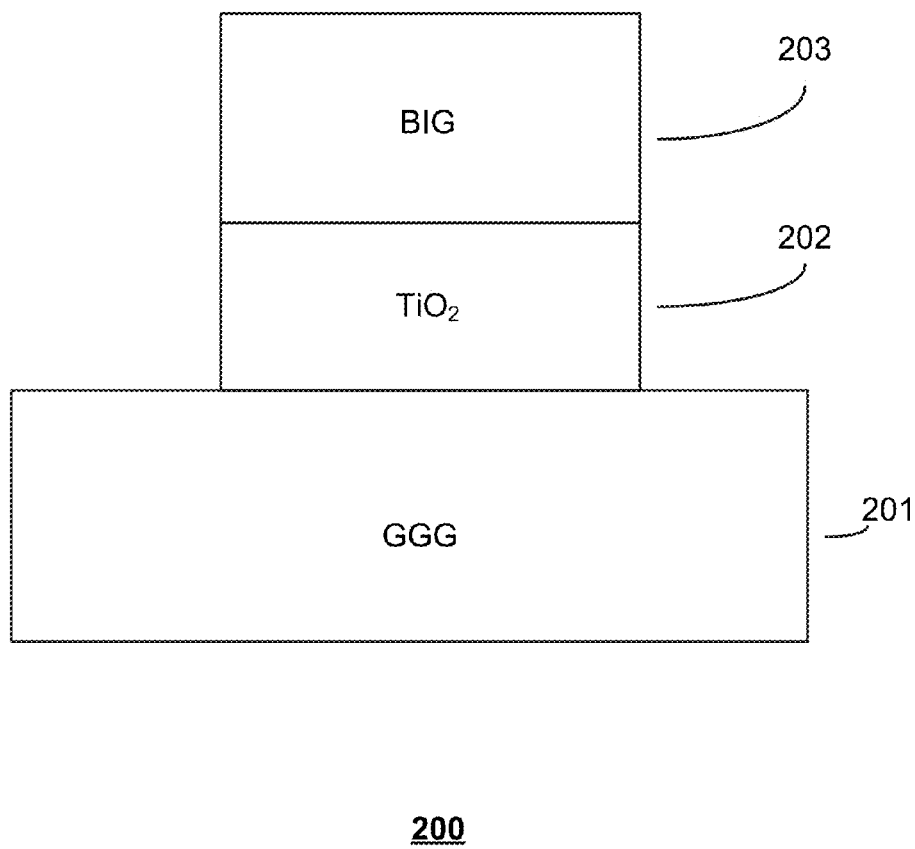
FIG. 2 illustrates an optical isolator 200 in accordance with a more particular embodiment of the invention.

FIG. 2 illustrates an optical isolator 200 in accordance with a more particular embodiment of the invention. The embodiment of FIG. 2 is a more specific example of the embodiment of FIG. 1. In particular, optical isolator 200 comprises a substrate 201, a first waveguide portion 202, and a second waveguide portion 203. Material for substrate 201 comprises gadolinium gallium garnet ("GGG"). Material for first waveguide portion 202 comprises titanium dioxide ("TiO$_2$"). Material for second waveguide portion 203 comprises bismuth iron garnet ("BIG"). In one embodiment, the BIG and TiO$_2$ layers are grown separately and wafer bonded together.

Figure 3:
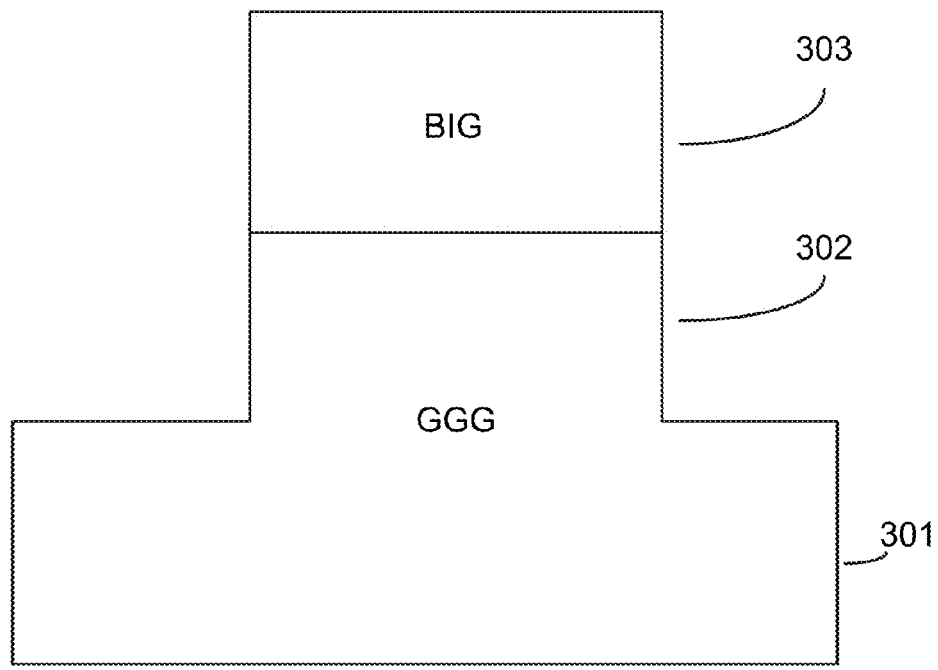
FIG. 3 illustrates an optical isolator 300 in accordance with another embodiment of the invention.

FIG. 3 illustrates an optical isolator 300 in accordance with another embodiment of the invention. Optical isolator 300 comprises a rib waveguide structure and comprises substrate 301, a first waveguide portion 302, and a second waveguide portion 303. Material for substrate 301 comprises GGG. Material for first waveguide portion 302 also comprises GGG. Material for second waveguide portion 303 comprises BIG. In one embodiment, isolator 300 is fabricated by growing BIG on GGG and etching the waveguide with a mask.

Figure 4:
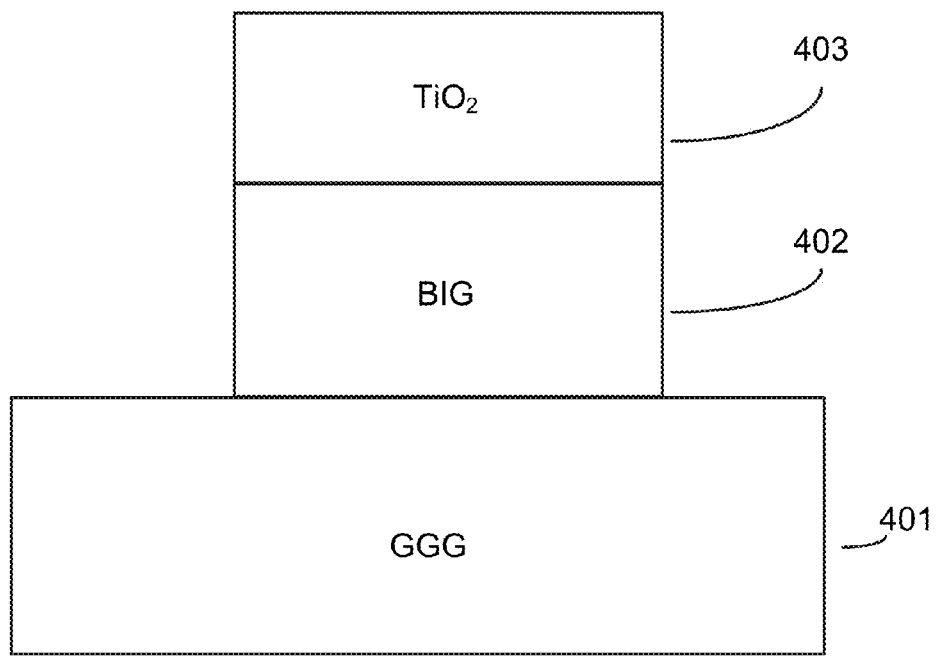
FIG. 4 illustrates an optical isolator 400 in accordance with another embodiment of the invention.

FIG. 4 illustrates an optical isolator 400 in accordance with another embodiment of the invention. Optical isolator 400 comprises a substrate 401, a first waveguide portion 402, and a second waveguide portion 403. Material for substrate 401 comprises GGG. Material for first waveguide portion 402 comprises BIG. Material for second waveguide portion 403 comprises TiO$_2$.

Figure 5:
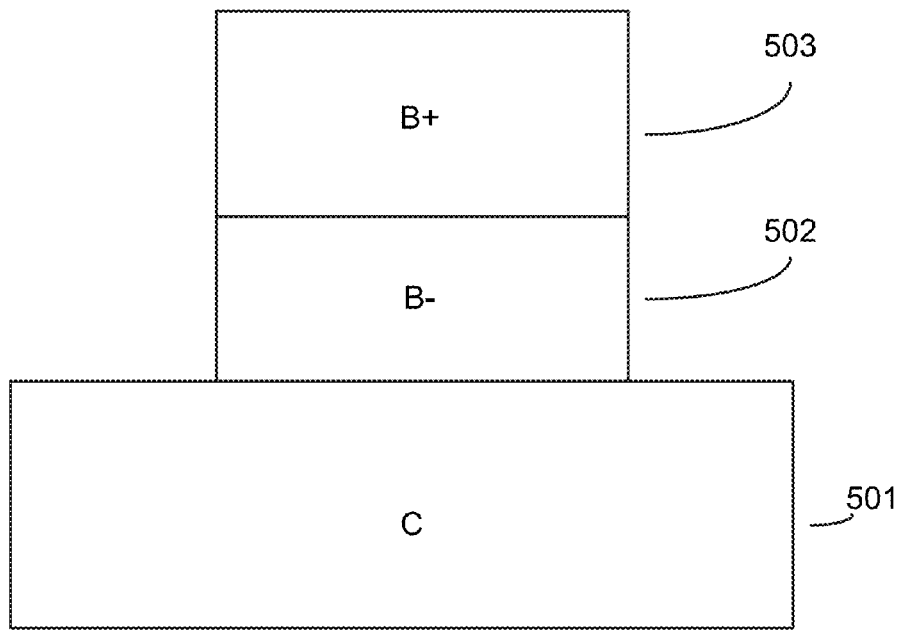
FIG. 5 illustrates an optical isolator 500 in accordance with another embodiment of the invention.

FIG. 5 illustrates an optical isolator 500 in accordance with another embodiment of the invention. Optical isolator 500 comprises substrate portion 501, first waveguide portion 502 and second waveguide portion 503. Substrate 501 comprises a low index material C. First waveguide portion 501 comprises a magnetic material B− and second waveguide portion 503 comprises a magnetic material B+. With respect to each other, material B− and B+ have anti-parallel magnetizations. In a particular embodiment, material B+ has the permittivity tensor as given above for material B+ in reference to FIG. 1, and material B− has a permittivity tensor given by:

$$\tilde{\varepsilon}_{ud,B-} = \varepsilon_0 \begin{pmatrix} 12.25 & 0 & if \\ 0 & 12.25 & 0 \\ -if & 0 & 12.25 \end{pmatrix}$$

with the off-diagonal coefficient f=1. In one embodiment, materials B− and B+ both comprise BIG and are obtained by growing a first BIG layer on a substrate and treating it to obtain the magnetic characteristics corresponding to B− as indicated above and then growing a second BIG layer on top of the first BIG layer and treating it to obtain the magnetic characteristics corresponding to B+ as indicated above.

Preferably, a structure with anti-parallel magnetic regions provides a "compensation wall" separating the two magnetic regions. Forming such a structure with a compensation wall is performed as follows: the bottom layer of BIG is grown and annealed. Then, more BIG is grown and annealed under different conditions to reverse the sign of the magnetization compared with the bottom layer. For left-right structures, Si masks are used: a mask is placed on the left side and the right side is annealed; then a mask is placed on the right side and the left side is annealed under different conditions. For more details on this process please see: J.-P. Krumme and P. Hansen, "New magneto-optic memory concept based on compensation wall domains," Appl. Phys. Lett., vol. 23, no. 10, pp. 576-578, 1973.

Figure 6:
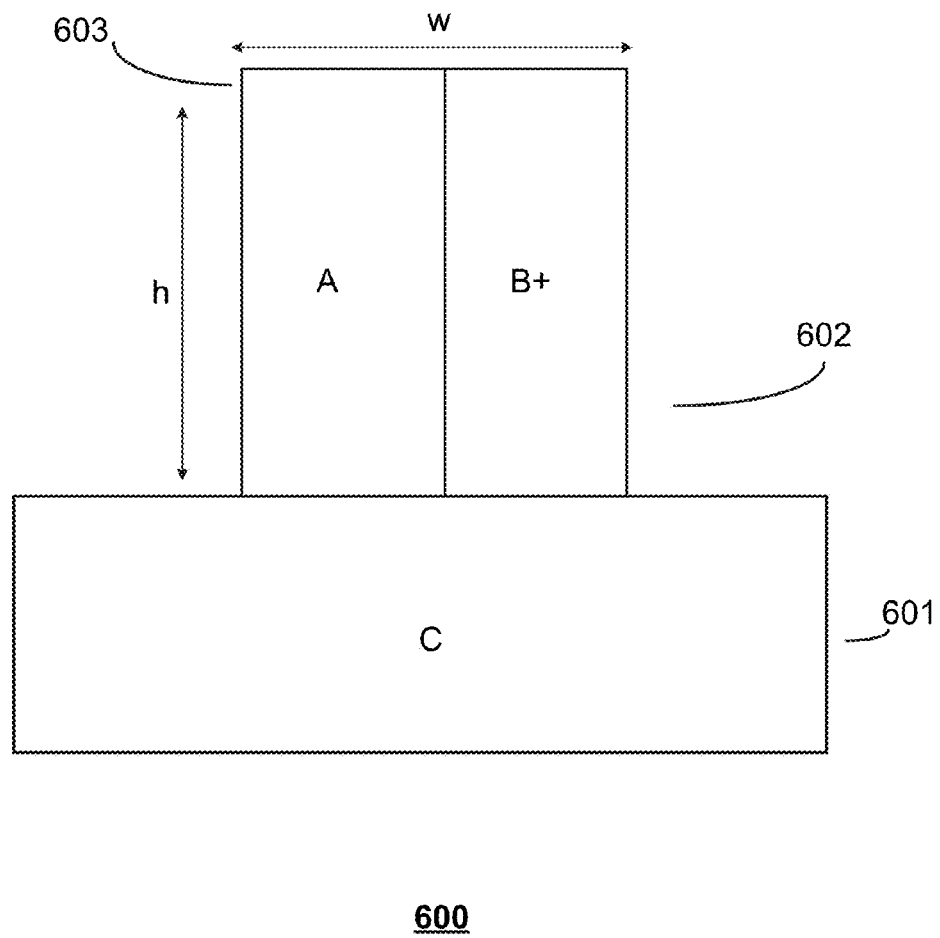
FIG. 6 illustrates an optical isolator 600 in accordance with another embodiment of the invention.

FIG. 6 illustrates an optical isolator 600 in accordance with another embodiment of the invention. Optical isolator includes a substrate 601, a first waveguide portion 602 and a second waveguide portion 603. The materials used for waveguide 600 are similar to the materials used for waveguide 100 of FIG. 1 and include a low-index material C for substrate 601, a magnetic material B+ for first waveguide portion 602 and a non-magnetic material 603 for second waveguide portion 603. However, in optical isolator 600, the first and second waveguide portions are provided side-by-side on substrate 601 instead of one on top of the other (as in FIG. 1). In one embodiment, the ratio of dimensions h/w is 3/4 and in another embodiment the ratio is 1. However, other ratios may be used, preferably being selected to obtain a single mode in the desired frequency range. In one embodiment, the permittivity tensor ε for material B+ in the embodiment of FIG. 6 (referenced as a "right left" or "rl" arrangement) is given by:

$$\tilde{\varepsilon}_{rl,B+} = \varepsilon_0 \begin{pmatrix} 12.25 & -if & 0 \\ if & 12.25 & 0 \\ 0 & 0 & 12.25 \end{pmatrix}$$

with the off-diagonal coefficient f=1.

Figure 7:
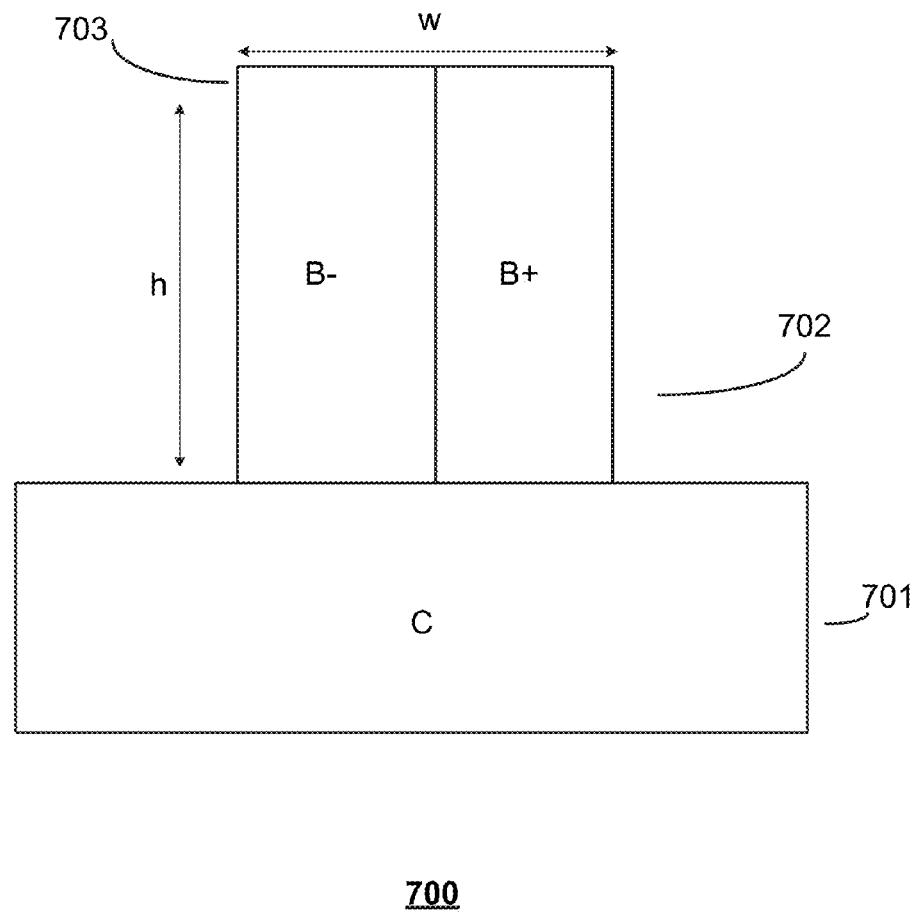
FIG. 7 illustrates an optical isolator 700 in accordance with another embodiment of the invention.

FIG. 7 illustrates an optical isolator 700 in accordance with another embodiment of the invention. Optical isolator 700 comprises substrate portion 701, first waveguide portion 702 and second waveguide portion 703. Substrate 701 comprises a low index material C. First waveguide portion 702 comprises a magnetic material B+ and second waveguide portion 703 comprises a magnetic material B−. With respect to each other, material B− and B+ have anti-parallel magnetizations. In a particular embodiment, material B+ for portion 702 has the permittivity tensor as given above for material B+ in reference to FIG. 6, and material B− for portion 703 has a permittivity tensor given by:

$$\tilde{\varepsilon}_{rl,B-} = \varepsilon_0 \begin{pmatrix} 12.25 & if & 0 \\ -if & 12.25 & 0 \\ 0 & 0 & 12.25 \end{pmatrix}$$

with the off-diagonal coefficient f=1. In another embodiment, the permittivity tensors for the B+ and B− materials are given by:

$$\tilde{\varepsilon}_{rl,B\pm} = \varepsilon_0 \begin{pmatrix} 6.25 & \mp 0.06i & 0 \\ \pm 0.06i & 6.25 & 0 \\ 0 & 0 & 6.25 \end{pmatrix}$$

In one embodiment, the h/w ratio is 3/4. In another embodiment, it is 1/2. In another embodiment, it is 1.

Figure 8:
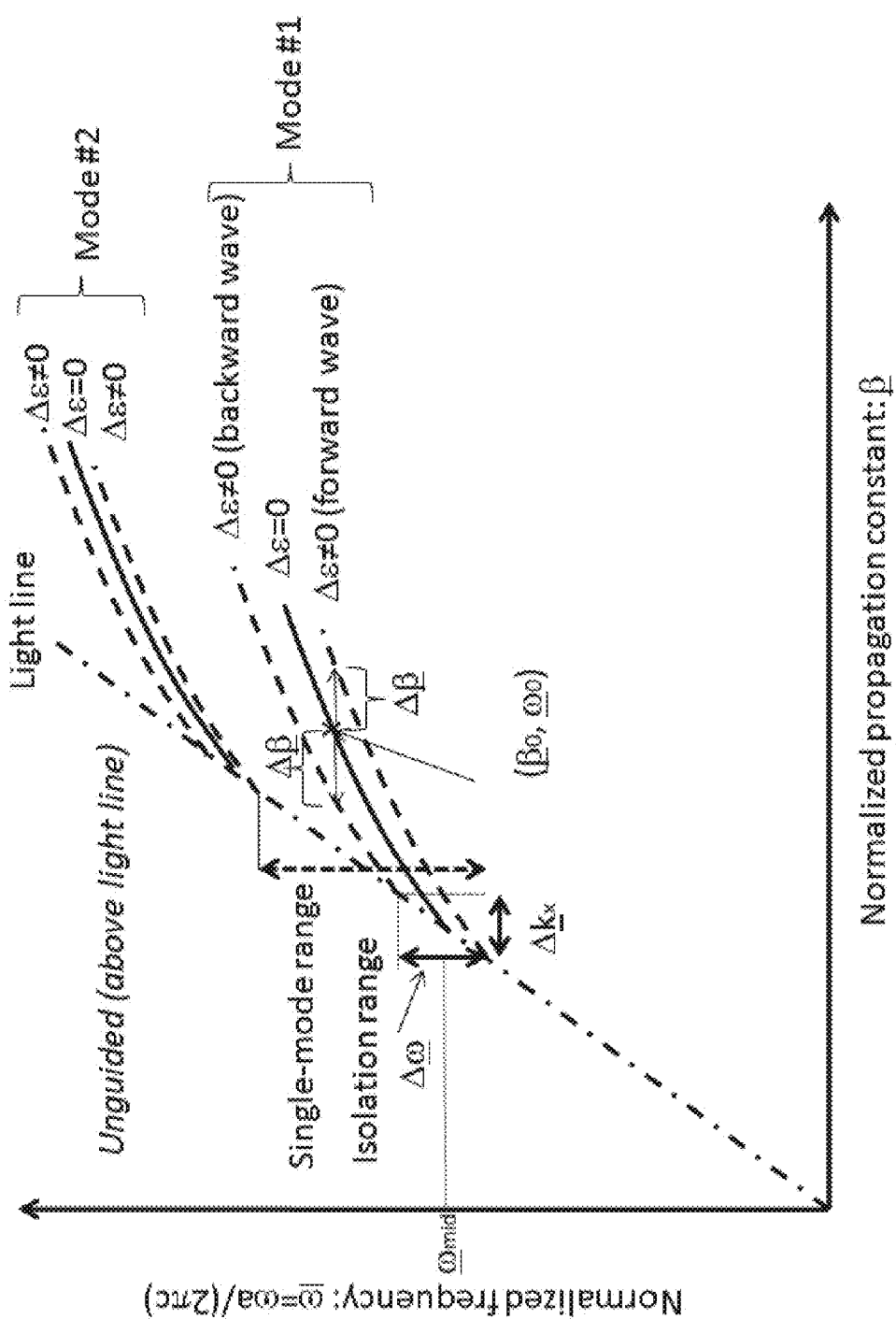
FIG. 8 shows illustrate some dispersion curves satisfying cutoff frequency conditions preferable for some embodiments of the invention.

FIG. 8 illustrates the dispersion curves of an isolator that satisfies the cutoff frequency conditions preferable for some embodiments of the invention. Solid lines are the lowest and 2$^{nd}$ lowest modes for a waveguide that lacks nonreciprocal material—the off-diagonal permittivity components are zero. When appropriate non-zero off-diagonal components Δε are included, the time-reversal degeneracy of modes is lifted, i.e. forward wave has different dispersion from backward wave as seen in FIG. 8. Waves are guided in a waveguide if the operation point ($\underline{\beta}_0, \underline{\omega}_0$) is below the light line where $\underline{\beta}_0$ and $\underline{\omega}_0$ are normalized propagation constant ($ak_x/2\pi$) and angular frequency ($\omega a/2\pi c$), respectively. The parameter a is scaling length. The intersection of a mode with the light line defines the cut-off frequency. Below the frequency, the mode is unguided and the waveguide loses energy. The isolation range is shown in FIG. 8, and in this frequency range optical isolation is realized.

The position-dependent permittivity tensor is given by the addition of two permittivity tensors:

$$\tilde{\varepsilon} = \begin{pmatrix} \varepsilon_{xx} & 0 & 0 \\ 0 & \varepsilon_{yy} & 0 \\ 0 & 0 & \varepsilon_{zz} \end{pmatrix} + \begin{pmatrix} 0 & iu & -iw \\ -iu & 0 & iv \\ iw & -iv & 0 \end{pmatrix} = \tilde{\varepsilon}_o + \Delta\tilde{\varepsilon} \quad (1)$$

The tensor $\tilde{\varepsilon}$ is Hermitian, and $\Delta\tilde{\varepsilon}$ is considered as a perturbation term. The propagation constant shift is written, using equation (1), as:

$$\Delta\beta(\omega) = \frac{2\omega^2(I_{yx} + I_{xz} + I_{zy})}{c^2\beta_0} \quad (2)$$

where $\omega$ is the angular frequency, E(y,z) is the normalized electric field, and x is the propagation direction and $I_{yx} = \iint u(y,z) Im[E^*_y(y,z)E_x(y,z)] dy dz$ $I_{zy} = \iint v(y,z) Im[E^*_z(y,z)E_y(y,z)] dy dz$ $I_{xz} = \iint w(y,z) Im[E^*_x(y,z)E_z(y,z)] dy dz.$ (3)

Given the electric field E(y,z) and dispersion $\underline{\omega}(\beta)$ of an un-perturbed mode and small perturbation $\Delta\tilde{\varepsilon}$ (y,z), we can obtain the dispersion relation $\underline{\omega}(\beta \pm \Delta\beta)$ of forward (−) and backward (+) propagating waves from equation (2). The isolation frequency range can be maximized by maximizing $\Delta\beta$. In a relatively narrow frequency range, $\Delta\beta$ is proportional to the isolation frequency range.

Figure 9B:
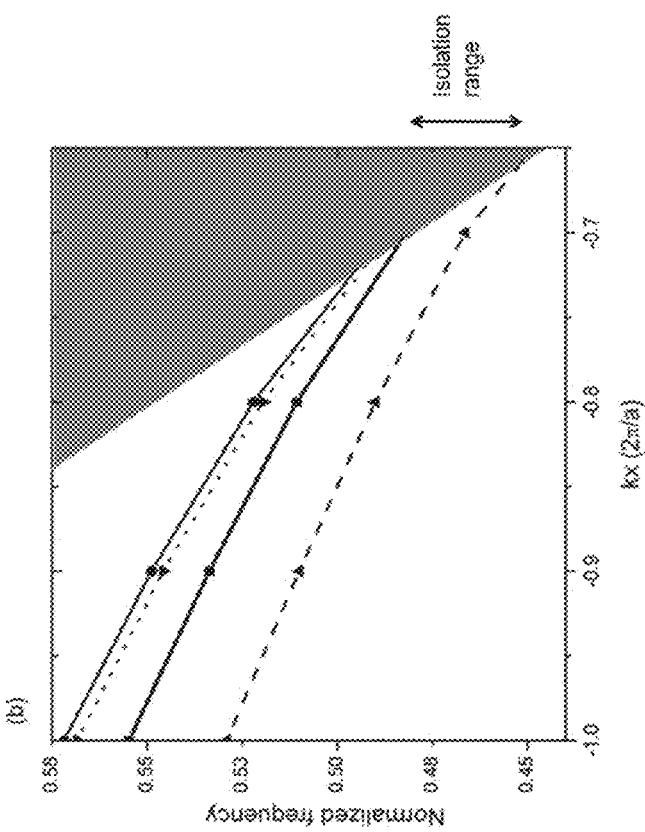
FIGS. 9a and 9b illustrate the dispersion diagrams for the embodiment of FIG. 7.
Figure 9A:
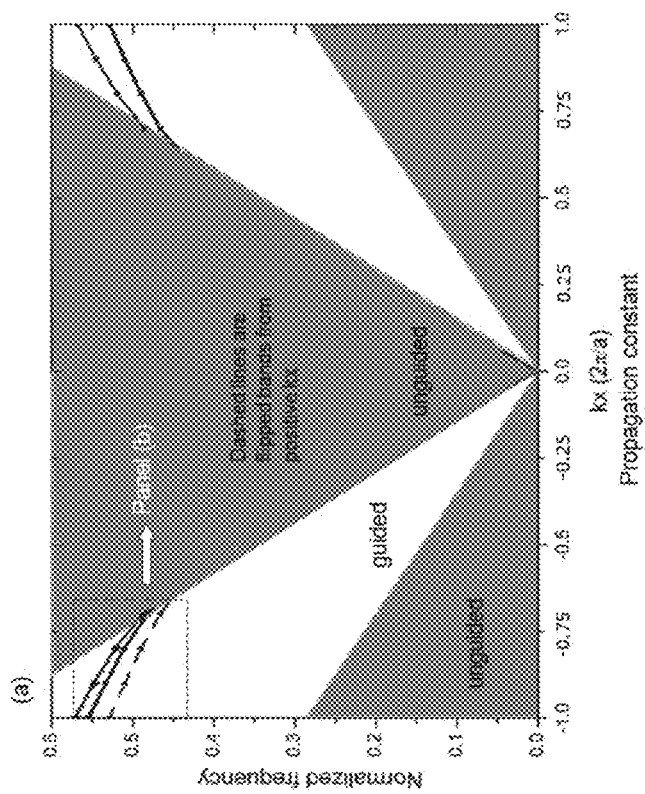

FIGS. 9a and 9b illustrate the dispersion diagrams for the embodiment of FIG. 7 assuming a h/w ratio of 3/4. In the negative $k_x$ region, the forward propagation bands with positive $k_x$ are drawn by setting $-k_x$, i.e. the bands are flipped about $k_x=0$. The dispersion diagrams indicate single-mode optical isolation operation, as the lowest forward-propagating mode (dashed line) lies below the cutoff frequency of the lowest backward-propagating mode (lower solid line). The frequency separation between the dashed line and the lower solid line indicates the isolation bandwidth.

Figure 10A:
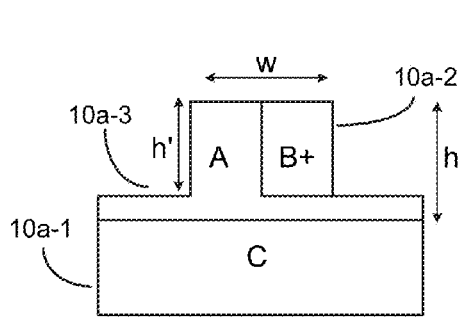
FIGS. 10a-10c illustrate several different optical isolators consistent with alternative embodiments of the invention.
Figure 10B:
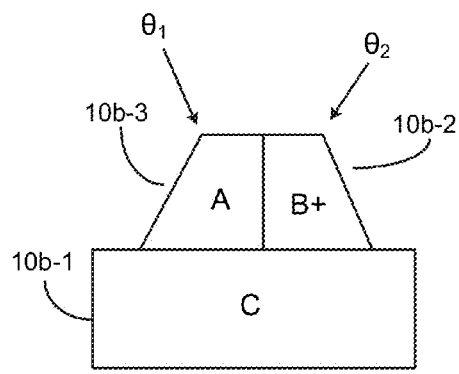
Figure 10C:
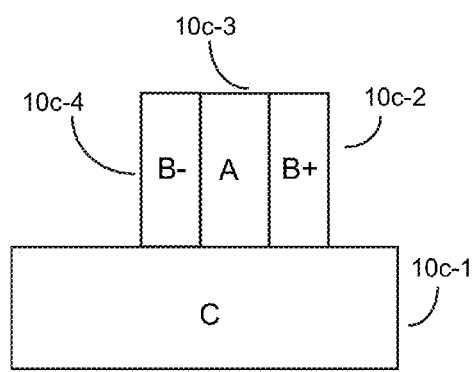

FIGS. 10a-10c illustrate several different optical isolators consistent with alternative embodiments of the invention. The isolator of FIG. 10a comprises a rib waveguide structure and comprises substrate 10a-1, first waveguide portion 10a-2, and second waveguide portion 10a-3. In one embodiment, the ratio of the dimensions h/h'/w is 3/2.8/4. Substrate 10a-1 comprises material C. First waveguide portion 10a-2 comprises material B+. Second waveguide portion 10a-3 comprises material A.

The isolator of FIG. 10b comprises substrate 10b-1, first waveguide portion 10b-2, and second waveguide portion 10b-3. The waveguide portions together comprise a trapezoidal arrangement characterized by angles θ1 and θ2. Substrate 10b-1 comprises material C, first waveguide portion 10b-2 comprises material B+ and, second waveguide portion 10b-3 comprises material A. In one embodiment, θ1=θ2=120°. In other embodiments, the angles are not necessarily equal.

The isolator of FIG. 10c comprises substrate 10c-1, first waveguide portion 10c-2, second waveguide portion 10c-3 and third waveguide portion 10c-4. Substrate 10c-1 comprises material C, first waveguide portion 10c-2 comprises material B+, second waveguide portion 10c-3 comprises material A, and third waveguide portion 10c-4 comprises material B−.

Various embodiments disclosed herein include non-homogenous waveguides that include magnetic and non-magnetic portions. One specific example for the magnetic material B referenced herein is BIG (see, e.g., FIGS. 2-4). However, those skilled in the art will appreciate that in some embodiments, other magnetic materials might be used without departing from the spirit and scope of the present invention. Some examples of magneto-optic media that might be used as material B in a particular embodiment include BIG, YIG (yttrium iron garnet), magnetic glass, MnAs, GaAs:Mn, magnetic GaAs, magnetic Si, CdMnTe, Ni, Co, Fe, and magnetic $TiO_2$. In some embodiments, these materials may be used in combination. For example, YIG can be used in conjunction with BIG and GGG.

The permittivity values for the various materials referenced herein can be varied from the above values as one skilled in the art can appreciate. For example, in the examples set forth above, the magnitude of the permittivity coefficient for material A is 12.25, which is the same value as the diagonal elements of the permittivity tensor for materials B− and B+ in many of the various up-down and right left configurations referenced above. However, in alternative examples, material A might have a different permittivity value than the diagonal values of the B+ and B− permittivity tensor matrices. And the values along the diagonal of the permittivity tensor matrices may, in other examples, have values different than 12.25. As another example of variation, the zero values shown in the various matrices above might, in alternative examples, be non-zero without necessarily departing from the spirit and scope of the present invention. The value "f" shown in the matrices should be non-zero.

In analyzing the performance of various configurations, key quantitative values include: the off-diaganol permittivity tensor values, the propagation constant k (x-axis of dispersion diagrams), and the frequency bandwidth for single mode operation. The range of single mode isolation for the waveguide is thus defined by $\Delta\underline{k}_x = \Delta k_x(a/2\pi)$ and $\Delta\underline{\omega} = \Delta\omega$ (a/2πc). The value of $\Delta\underline{\omega}$ is the isolation range; see FIG. 1. Table 1 displays a summary of the numerical data of some analyzed configurations. Note that the maximum isolation bandwidth in the below table for the waveguides is $\Delta\omega/\omega_{mid} = 8.17\%$ for the right-left waveguide with the dimensions $\{w_{B-}/a=0.3, w_{B+}/a=0.3$ where a is a scaling factor. We use $\Delta\omega/\omega_{mid}$ as a normalized optical isolation width. Also, the off-diagonal permittivity coefficient f for material B+/− is 1 in the structures analyzed in Table 1.

TABLE 1

| FIG. | Type | h/w | $\underline{k}_x$ | $\Delta \underline{k}_x$ | isolation freq. range | $\Delta\underline{\omega}$ | $\Delta\omega/\omega_{mid}$ | $\sum_{i \neq j} I_{ij}$ |
|---|---|---|---|---|---|---|---|---|
| 6 | rl (AB+) | 0.3/0.4 | 0.670-0.694 | 0.024 | 0.4588-0.4755 | 0.0167 | 3.57% | 21.1 |

TABLE 1-continued

| FIG. | Type | h/w | $\underline{k}_x$ | $\Delta \underline{k}_x$ | isolation freq. range | $\Delta \underline{\omega}$ | $\Delta \underline{\omega}/\omega_{mid}$ | $\sum_{i \neq j} I_{ij}$ |
|---|---|---|---|---|---|---|---|---|
| 7 | rl (B − B+) | 0.3/0.4 | 0.660-0.706 | 0.046 | 0.4520-0.4836 | 0.0316 | 6.76% | 42.3 |
| 7 | rl (B − B+) | 0.3/0.6 | 0.451-0.489 | 0.038 | 0.3088-0.3351 | 0.0263 | 8.17% | 49.2 |
| 10b | 3 layer (B + AB−) | 0.3/0.4 | 0.664-0.702 | 0.038 | 0.4551-0.4806 | 0.0255 | 5.45% | −32.3 |
| 10a | Rib | h/h'/w 0.3/0.28/0.4 | 0.550-0.563 | 0.013 | 0.3770-0.3855 | 0.0085 | 2.23% | N/A |
| 10c | angle (120°/120°) AB+ | 0.3/0.4 | 0.471-0.497 | 0.026 | 0.3225-0.3381 | 0.0156 | 4.72% | 25.1 |
| 1, 2 | UD (AB+) | 0.4/0.3 | 0.642-0.665 | 0.023 | 0.4398-0.4557 | 0.0159 | 3.55% | 20.6 |
| 5 | UD (B − B+) | 0.4/0.3 | 0.636-0.673 | 0.037 | 0.4356-0.4610 | 0.0254 | 5.67% | 41.2 |

The isolation frequency range can be increased by increasing each component $I_{ij}$ as given above in equations (2) and (3). We increased isolation frequency range by increasing the field overlap with magneto-optic media. Table 1, shows results for two rl(B−B+) structures. We found strong linear correlation between the value of $$\sum_{i \neq j} I_{ij}$$

and the normalized isolation range $\Delta \underline{\omega}/\omega_{mid}$ in rigorous plane wave expansion ("PWE") simulations. The electric field outside the waveguide does not overlap with magneto-optic media in these figures, but this problem can be resolved by choosing appropriate single-mode waveguide geometries so that a majority of the field overlaps with magneto-optic media. For example, the waveguide can be embedded in a low-index magneto-optic medium to increase the isolation frequency range.

Note that the drawings are not intended to necessarily suggest a particular proportion of materials. For example, FIG. 6 does not necessarily suggest that exactly half the w dimension includes material A and the other half includes material B+. Rather, the relative amounts of each material may vary in particular embodiments. However, it is preferable that the materials are arranged in proportions that will support single mode operation.

The scheme of rejecting reversely-propagating waves is based on cutoff frequencies so the reverse isolation is high. If necessary, an absorption layer can be added somewhere in substrate C and/or above the waveguide so that only unguided waves are absorbed. Embodiments of the invented optical isolator can be used in integrated optics. Some embodiments of the invented isolator can be useful for suppressing unwanted noise generation and laser frequency shifts.

For more information, please also refer to Tang, Drezdzon, and Yoshie, "Single-mode waveguide optical isolator based on direction-dependent cutoff frequency" in Optics Express Vol. 16 No. 20, Sep. 29, 2008 and Drezdzon and Yoshie, "On-chip waveguide isolator based on bismuth iron garnet operating via nonreciprocal single-mode cutoff" in Optics Express Vol. 17, No. 11, May 25, 2009.

While the present invention has been particularly described with respect to the illustrated embodiments, it will be appreciated that various alterations, modifications and adaptations may be made based on the present disclosure and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. An optical isolator comprising:
   a waveguide on a substrate, the waveguide being dimensioned to operate in a single mode for a selected frequency range and the waveguide further being structured such that, given magneto-optical properties of the waveguide's material, the waveguide has a cutoff frequency in a forward propagation direction that is different than a cutoff frequency in a reverse propagation direction.

2. The optical isolator of claim 1 wherein:
   the waveguide includes first and second portions;
   one of the first and second waveguide portions comprises a magnetic material and;
   the other of the first and second waveguide portions comprises a non-magnetic material.

3. The optical isolator of claim 2 wherein the non-magnetic material is a same material as a material of the substrate.

4. The optical isolator of claim 2 wherein the non-magnetic material is a different material than a material of the substrate.

5. The optical isolator of claim 2 wherein the first and second waveguide portions are arranged side-by-side on the substrate.

6. The optical isolator of claim 2 wherein the first waveguide portion is on the substrate and the second waveguide portion is on the first waveguide portion.

7. A method of propagating optical energy, the method comprising:
   introducing the optical energy into a wave guide, the waveguide being dimensioned to operate in a single mode for a selected frequency range and the waveguide further being structured such that, given magneto-optical properties of the waveguide's material, the waveguide has a cutoff frequency in a forward propagation direction that is different than a cutoff frequency in a reverse propagation direction.

8. The method of claim 7 wherein:
   the waveguide includes first and second portions;
   one of the first and second waveguide portions comprises a magnetic material and;
   the other of the first and second waveguide portions comprises a non-magnetic material.

9. The method of claim 8 wherein the non-magnetic material is a same material as a material of a substrate on which the waveguide is located.

10. The method of claim 8 wherein the non-magnetic material is a different material than a material of a substrate on which the waveguide is located.

11. The method of claim 8 wherein the first and second waveguide portions are arranged side-by-side on a substrate.

12. The method of claim 8 wherein the first waveguide portion is on a substrate and the second waveguide portion is on the first waveguide portion.

* * * * *